United States Patent [19]

Nall

[11] Patent Number: 4,493,232
[45] Date of Patent: Jan. 15, 1985

[54] ADJUSTABLE MANDREL FOR PORTABLE LATHE

[75] Inventor: Lawson H. Nall, Folsom, Calif.

[73] Assignee: TRI Tool, Inc., Rancho Cordova, Calif.

[21] Appl. No.: 444,153

[22] Filed: Nov. 24, 1982

[51] Int. Cl.³ .......................... B23B 3/22; B23B 5/16
[52] U.S. Cl. ........................................ 82/4 C; 82/44; 279/2 R
[58] Field of Search ................. 82/4 C, 4 R, 44; 279/2 R, 2 A

[56] References Cited

U.S. PATENT DOCUMENTS

| | | | |
|---|---|---|---|
| 1,869,780 | 8/1932 | Rosener | 279/2 |
| 2,436,152 | 2/1948 | Richards | 82/4 R |
| 2,478,310 | 8/1949 | Payne | 82/4 R |
| 3,871,670 | 3/1975 | Wright | 279/2 R |
| 4,169,396 | 10/1979 | Astle | 82/4 C |
| 4,245,529 | 1/1981 | Astle | 82/4 C |
| 4,246,814 | 1/1981 | Pertle | 82/4 C |

*Primary Examiner*—Leonidas Vlachos
*Attorney, Agent, or Firm*—Bacon & Thomas

[57] ABSTRACT

An adjustable mandrel for securing a portable lathe adjacent the end of a pipe to be prepared for welding includes a lathe support plate that is adjustable about a single miter axis relative to the body of the mandrel which is arranged to engage the I.D. of a pipe. The portable lathe is connectable to the support plate by means of a mandrel engaging fixture that enables the cutting plane of the lathe to be located adjacent the pipe end. The miter axis of the mandrel is always located so that it lies in a direction that is parallel to the cutting plane of the portable lathe. The miter angle can be set within a range of positions so that the pipe end can be cut at a precise miter angle in preparation for welding to another pipe section.

16 Claims, 8 Drawing Figures

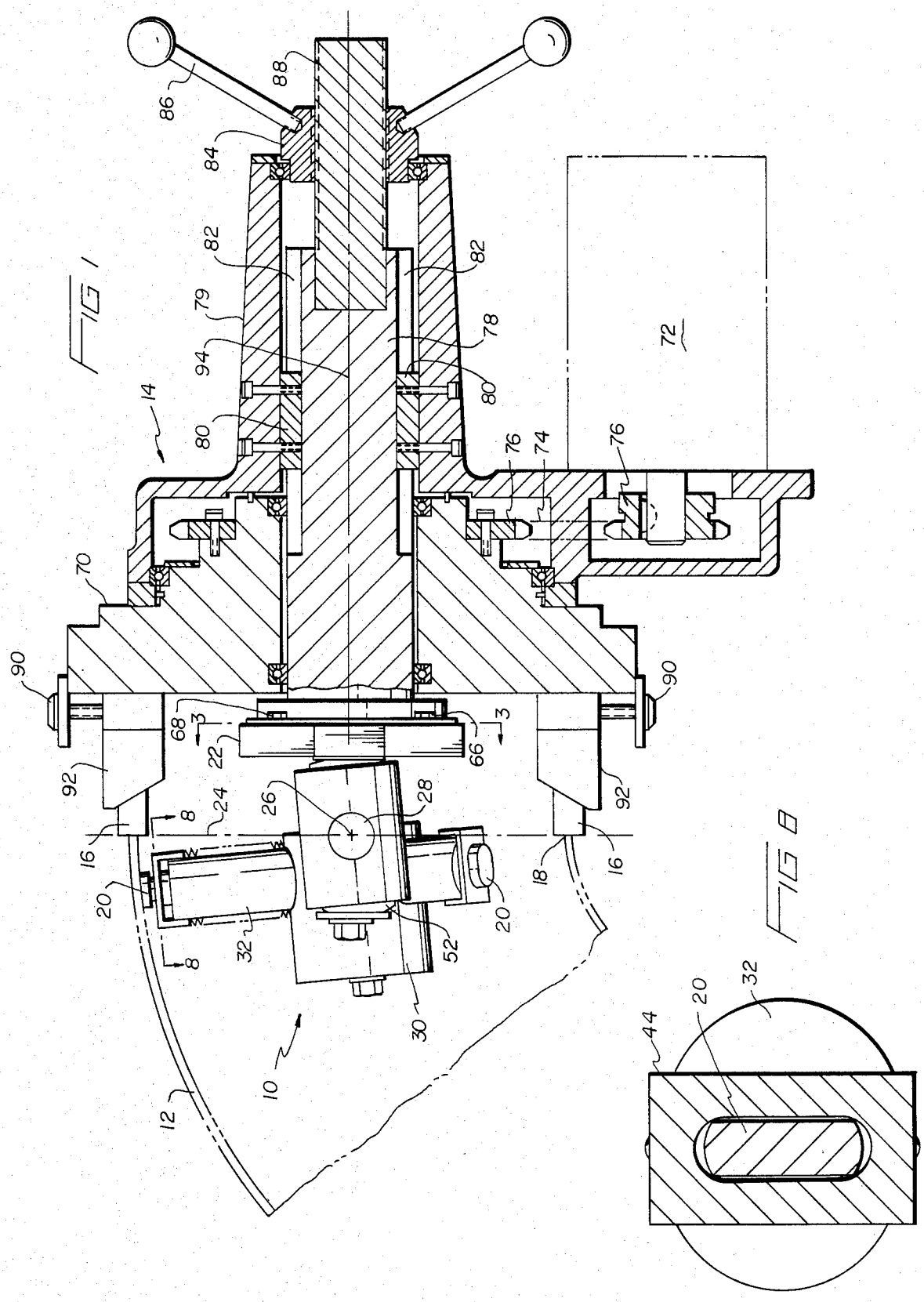

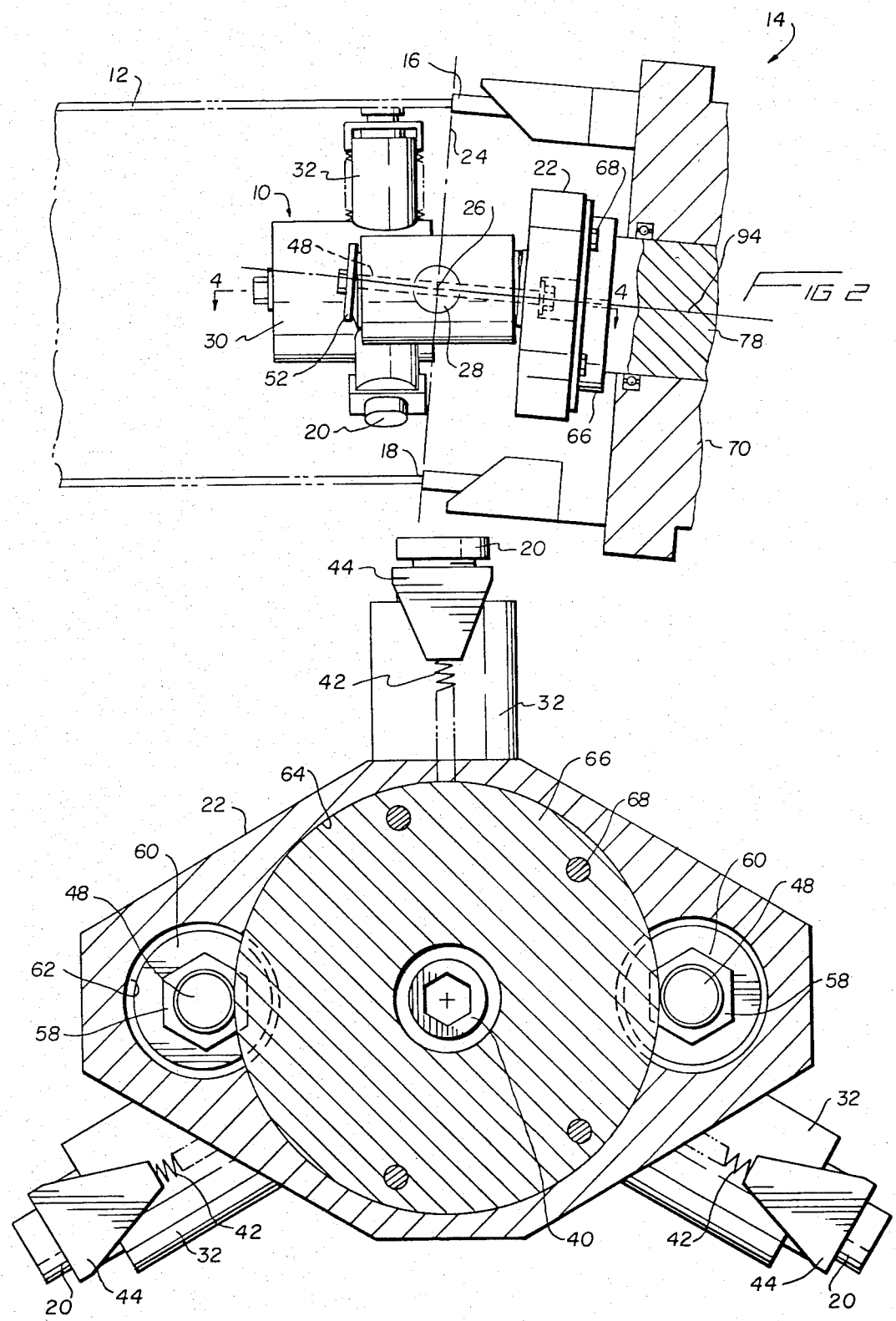

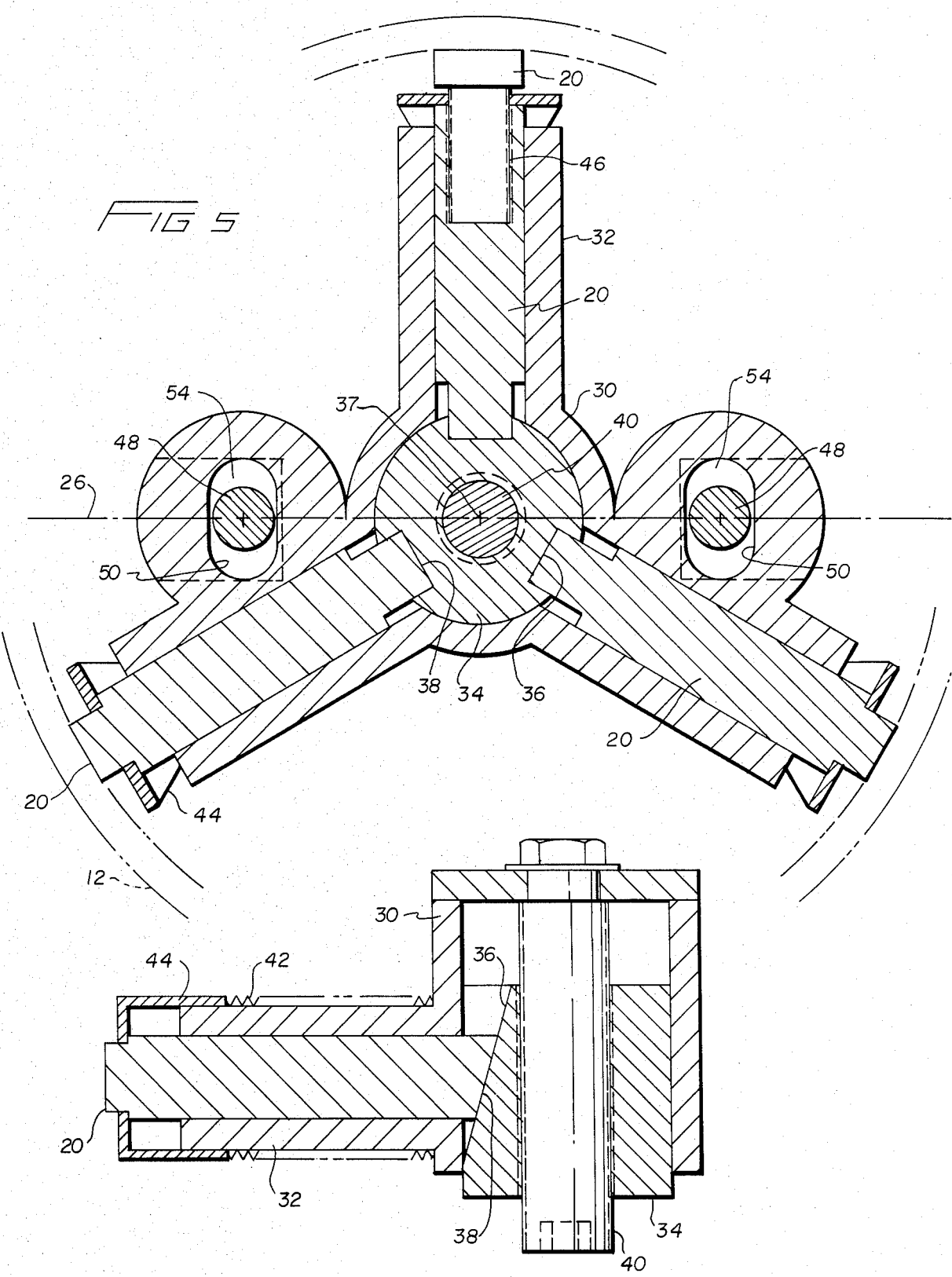

ADJUSTABLE MANDREL FOR PORTABLE LATHE

FIELD OF THE INVENTION

This invention is a mandrel for a portable lathe used to prepare pipe ends for welding.

BACKGROUND OF THE INVENTION

The preparation of pipe ends for welding is frequently carried out by the use of portable lathes that cooperate with various mandrel devices, whereby the pipe is secured in a fixed position relative to the portable lathe by means of the mandrel and the lathe is then advanced along the mandrel assembly to perform a turning operation on the pipe end.

Exemplary of such pipe end preparation systems are those illustrated in U.S. Pat. Nos. 3,164,062, 3,229,555, 3,982,451, and 3,992,123. In accordance with the systems of the prior art, it will be readily observed that, in general, the pipe workpiece is engaged by an internal mandrel that radially expands to engage the internal diameter of the pipe. The mandrel is usually provided with an axially extending shaft that supports the portable lathe adjacent the end of the pipe. The lathe is provided with cutting tool bits that are orbitally driven by a power source or manually about the longitudinal axis of the lathe.

The portable lathe itself, in accordance with the prior art, is typically provided with a feed means that enables the lathe assembly to be advanced along the shaft of the mandrel to cause engagement of the cutting tool bits with the end of the pipe to be prepared for welding. Thus, after the mandrel is secured within the pipe, the tool head of the portable lathe is caused to rotate and the cutting bits are advanced into the pipe end to complete the preparation operation.

According to conventional prior art practice, the mandrel arrangements are conventionally designed to provide an accurate centering of the lathe along the longitudinal centerline of the pipe, and to position the cutting plane of the lathe perpendicular to the pipe axis, since it is somewhat critical in accordance with usual practice to turn a precise concentric and perpendicular surface on the end of the pipe in preparation for a subsequent welding operation. Thus, it will be seen from the prior art examples that conventional mandrels are arranged to rigidly support the portable lathe along the centerline of the pipe, and no provision whatsoever is made to permit any relative angular motion between the centerline of the lathe and the centerline of the mandrel after the mandrel is locked into position in the pipe.

This rigid interconnection between mandrel and lathe in accordance with the prior art functions in a desirable manner as long as the end of the pipe is to be machined in a cutting plane that is normal to the centerline of the pipe. However, in actual practice, it is often desirable to make a miter cut on the end of the pipe to enable the pipe to be welded to an adjacent pipe segment that is not in line with the first pipe.

Accordingly, the present invention was created to enable miter cuts to be made on the end of a pipe by a portable lathe to prepare the pipe for welding to another pipe section the centerline of which extends at an angle to the centerline of the first pipe.

BRIEF DESCRIPTION OF THE INVENTION

The present invention is an adjustable mandrel for a portable lathe that enables the lathe to be secured adjacent the end of a pipe to be prepared for welding, whereby the mandrel can execute a miter cut at any desired angle (within the operational range of the mandrel) while maintaining a precise relationship between the portable lathe and the pipe.

The mandrel constructed in accordance with this invention includes suitable radially extending securing legs for anchoring the mandrel to the interior diameter of a pipe workpiece. At the forward end of the mandrel, there is provided a lathe support means in the form of a flange or plate that is connectable to a corresponding mandrel engaging fixture at the forward end of a portable lathe. When the mandrel and the lathe are coupled together, the lathe can only move relative to the pipe about a single axis that is located in the cutting plane of the lathe at the position of the final miter cut that is made on the workpiece.

The mandrel, moreover, is provided with a swivel joint that enables the lathe support plate to be selectively pivoted about a single miter axis. This is accomplished by means of a pair of carrier shafts mounted on the mandrel housing by means of spherical washers and trunnion bearings that limit the motion of the shafts strictly about a single miter cutting axis. The assembly is configured to be extremely rugged, simple to manufacture, and yet fully capable of supporting the lathe so that a precise miter cut can be executed on the end of a pipe workpiece.

The portable lathe is generally conventional, with the exception of a mandrel engaging fixture disposed at the forward end of the lathe adjacent its cutting plane. The mandrel engaging fixture includes a shaft upon which the lathe is mounted for rotation thereabout and movement axially therealong. The cutter bits are mounted on the head of the lathe in a conventional manner and are advanced into the end of the pipe as the portable lathe is advanced along the shaft of the mandrel engaging fixture. The miter axis of the mandrel always extends in a direction that is parallel to the cutting plane of the lathe, and therefore, at the final cutting position of the bits, the cutting plane of the portable lathe can and will be located in the same plane as the miter axis on the mandrel.

The mandrel constructed in accordance with this invention, accordingly, permits the portable lathe to be mounted to the end of a pipe to be prepared for welding at a precise miter angle so that the end of the pipe can be faced and bevelled at a desired, precise miter angle in preparation for joining the pipe to a similar prepared pipe, whereby the two pipe sections can be joined together in the desired angular relationship.

BRIEF DESCRIPTION OF THE DRAWINGS

FIG. 1 is a side elevational partial centerline sectional view of the invention shown in its operational environment with a portable lathe in an elbow section of a pipe to be machined;

FIG. 2 is a top plan view of the mandrel shown in FIG. 1, with the mandrel rotated 90°;

FIG. 3 is a sectional view taken along line 3—3 in FIG. 1;

FIG. 5 is a sectional view taken along line 5—5 in FIG. 4;

FIG. 7 is a sectional view taken along 7—7 in FIG. 4; and

FIG. 8 is a sectional view taken along line 8—8 in FIG. 1.

DESCRIPTION OF THE PREFERRED EMBODIMENT

Figure 4:
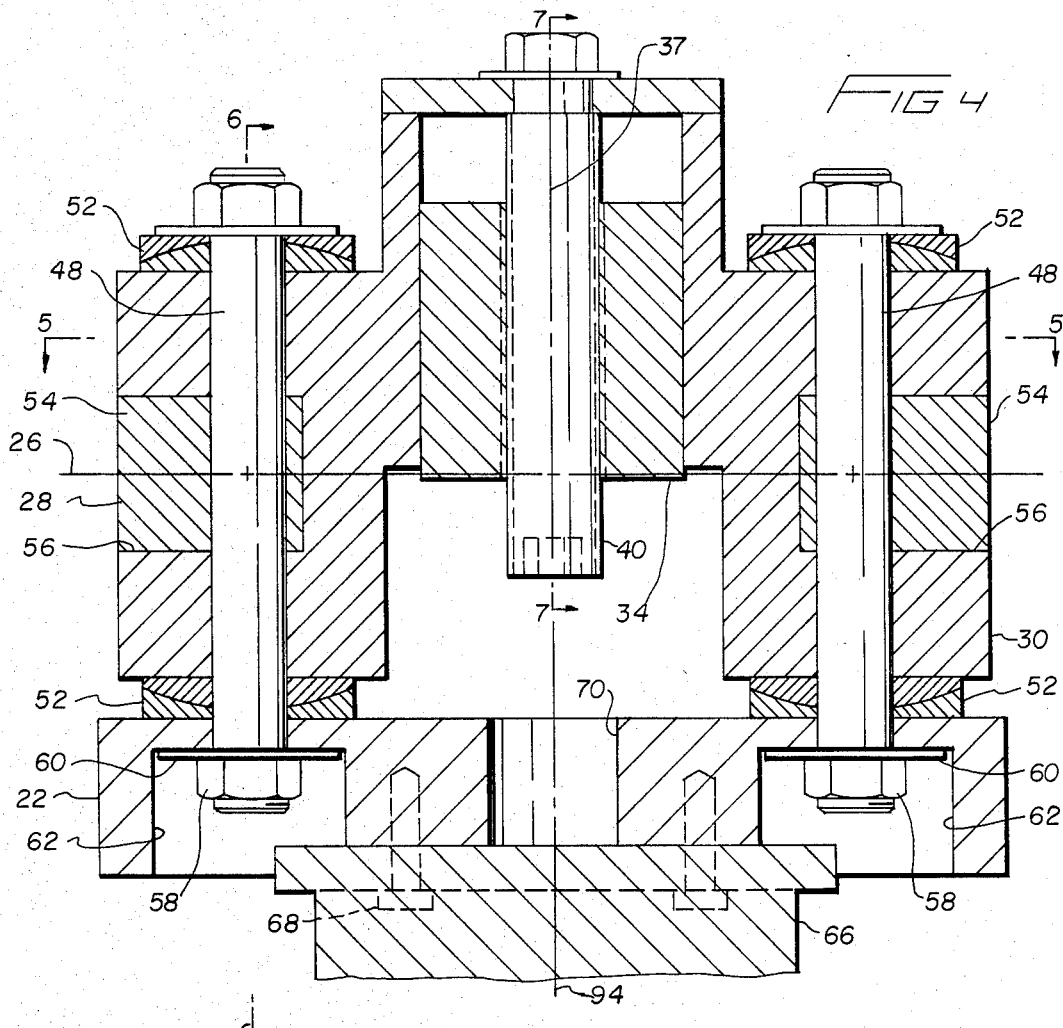
FIG. 4 is a centerline sectional view taken along line 4—4 in FIG. 2.

With reference to FIG. 1 of the drawings, the mandrel 10 constructed in accordance with the present invention is shown located within an elbow section of pipe 12 shown in phantom, with a portable lathe 14 secured to the forward end of the mandrel 10, whereby the cutter bits 16 of the lathe can perform a machining operation on the exposed end 18 of pipe section 12.

The mandrel 10 is secured to the interior of the pipe section 12 by means of radially extendable securing legs 20 that are expansible to engage the interior diameter of the pipe section to secure the mandrel assembly so that its principal longitudinal axis is disposed along the central axis of the pipe section.

The portable lathe 14 is secured to the mandrel 10 by bolting same to a lathe support plate 22 located at the forward end of the mandrel 10. The portable lathe 14 is mounted to the plate 22 so that the cutting plane 24 of the lathe, which is defined at the plane including the orbital path of movement of the cutting edge(s) of the tool bits 16 when they are moved in their orbital path about the central axis of the lathe, will be parallel to the miter axis 26 that is established by the trunnion bearings 28 disposed within the mandrel 10, as will be more specifically described below. Thus, the portable lathe 14 can be pivotally moved about the miter axis 26 to perform a miter cut on the end area 18 of the pipe section.

The trunnion bearing 28 limits the pivoting motion to a single plane about the axis 26 and it will be evident from the description to follow that the position of the portable lathe with respect to the axis 26 can be securely fixed while the miter cutting operation is in progress. Moreover, the structural arrangement of the mandrel 10 and the connection to the portable lathe 14 enables the performance of precise miter cutting and pipe end preparations on the end area of pipes and tubular workpieces.

FIG. 2 shows the mandrel 10 installed in the pipe section 12 from above, but the mandrel has been rotated about its longitudinal axis 90° so that the trunnion axis 26 is now located vertically, instead of horizontally as in FIG. 1. This has been achieved simply by rotating the mandrel 10 about its principal longitudinal axis and extending the securing legs 20 so they engage the inner diameter of the pipe section 12 in a rotated position. This view illustrates how a different miter angle can be cut on the end of the pipe section 12 simply by relocating the mandrel 10 within the pipe section, which in effect rotates the miter axis about the mandrel and pipe longitudinal axis. Of course, the mandrel 10 can be rotated to any circumferential position within the pipe section to accurately position the miter axis relative to the end section 18 of the pipe section 12.

The compact configuration of the mandrel 10 enables it to be located within a very short section of the end area of the pipe section 12, whereby it is adapted for use with elbow sections of pipes, as shown in FIGS. 1 and 2.

It will be evident from observing FIGS. 1 and 2, as well as FIG. 4 to be discussed below, that the central longitudinal axes of the mandrel 10 and the lathe 14 intersect each other in a radial, longitudinal plane when the lathe is secured to the mandrel at the support plate 22. The respective axes can be aligned, as shown in FIG. 4, or can be rotated with respect to each other about the miter axis 26. However, the lateral or radial location of the respective axes will always be maintained in coincidental relationship with the centerline of the workpiece, such as the pipe section 12.

While the tool bits 16 have been shown here as square, facing cutters, it must be appreciated that the cutters could be shaped to perform a bevel cut on the end area 18 of the pipe 12. Moreover, any suitable configuration of cutter bit could be utilized to perform typical end preparation operations on the end of the pipe 12 in anticipation of a subsequent welding operation to join the pipe 12 to another pipe. Such pipe end preparation operations are generally well-known in the field of pipe welding.

The construction of the mandrel 10 can be understood with reference to FIGS. 3-8. The mandrel 10 comprises a central housing 30 from which project three radially extending arms 32 circumferentially equidistant from each other and within which are disposed the supporting legs 20. The legs 20 are supported within the radial arms 32 in such a manner that they are radially slideable within the arms under the control of an axially movable cam 34 as best seen in FIGS. 5 and 7. The cam 34 is axially slideable along the longitudinal axis 37 of the housing 30. Inclined cam surfaces 36 are provided about the exterior of the cam 34, the cam surfaces 36 engaging corresponding mating cam follower surfaces 38 at the inner ends of the supporting legs 20. The cam 34 is actuated along the central longitudinal axis 37 of the mandrel housing 30 by a threaded connection between a cam driving bolt 40 and the cam 34. Thus, rotation of the cam driving bolt 40 causes axial displacement of cam 34 and the radial extension of the legs 20 due to the interaction of the cam and follower surfaces 36, 38. When the driving bolt 40 is rotated to withdraw the cam 34, the supporting legs 20 will retract from the extended position under the influence of optional retracting springs 42 which engage the legs by means of end caps 44, as best seen in FIGS. 7 and 8. While a pair of springs 42 is shown in the drawings, it should be understood that a single spring can be used on one side of the cap 44, if desired.

It will thus be observable that the mandrel housing 30 can be readily inserted into the open end area of a pipe section 12 and centrally locked in position by radially extending the legs 20 by rotary manipulation of the cam driving bolt 40.

One of the legs 20 (see FIG. 5) is provided with a threaded section 46 so that at least one of the legs can be radially adjusted independently of the cam 34. Simple rotation of the end piece of the leg 20 will effect lengthening or shortening of the respective leg without movement of the cam 34.

A generally annular shaped lathe support plate 22 is secured to the forward end of the mandrel housing 30 by a pair of longitudinally projecting carrier shafts 48, as best seen in FIG. 4. The shaft 48 extends axially through elongated openings 50 in the housing 30 (see FIG. 5). The shafts 48, moreover, are joined to the housing 30 by means of a swivel joint assembly that includes opposed sets of matched spherical washers 52 and trunnion bearings 54. The trunnion bearings 54 comprise cylindrical elements that engage the carrier shafts 48 and are rotatable within cylindrical openings 56 in a pair of laterally projecting segments of the housing 30 (see FIG. 5).

The trunnion bearings 54 are disposed within the mandrel housing 30 so that the pivotal movement of the carrier shafts 48 is strictly limited to motion in a single plane about the miter axis 26, which is always parallel to the cutting plane of a lathe to be connected to the mandrel. It will be observed (FIG. 5) that the elongated openings 50 through which the carrier shafts 48 project are elongated in the direction of the plane of pivotal movement of the carrier shaft 48. As viewed in FIG. 5, for example, the shafts 48 can only move in a vertical plane about the axis 26, and the elongated openings 50 are elongated in the vertical plane of movement of the carrier shafts.

The matched set of spherical washers 52 are joined together along cooperating sliding surfaces that are spherically curved about a radius extending along a center line of the carrier shafts 48 with a center located on the axis 26. Thus, the shafts 48 are constrained against any relative axial motion with respect to the housing 30 yet are permitted to pivot about axis 26 by means of the combination of the spherical washers 52 and the trunnion bearings 54.

The angular positions of the shafts 48 can be set or adjusted by loosening a nut 58 secured to a threaded end of each of the shafts 48. The spherical washers will be locked together when compression is applied to them by tightening of the nuts 58. Adjustment of the angular position of the shafts 48, of course, requires loosening of the nuts 58 during the adjustment process.

Figure 6:
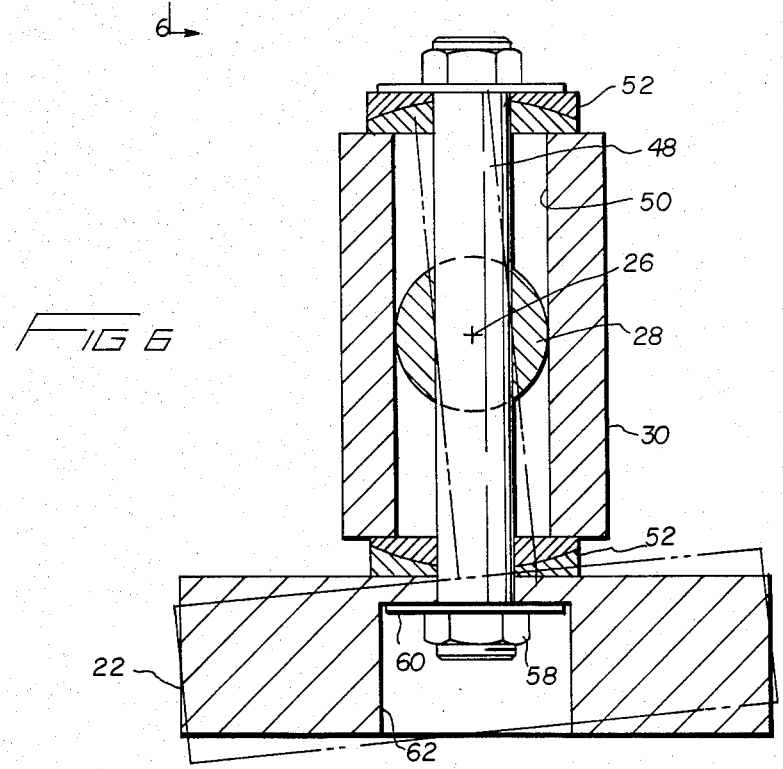
FIG. 6 is a sectional view taken along line 6—6 in FIG. 4.

The lathe support plate 22 is locked against the mandrel housing 30 by the carrier shafts 48 and the nuts 58, which may cooperate with appropriate washer elements 60. The plate 22, as seen in FIGS. 3 and 6, is generally annular in form, but somewhat elongated in a lateral sense to receive the carrier shafts 48 in counterbore 62. The plate 22 also includes an undercut shoulder area 64 that is arranged to receive a mating mandrel engaging fixture plate 66 (see FIGS. 1 and 3) located at the forward end of the lathe 14. The plate 22 is provided with apertures to receive removable fasteners 68 that are used to couple the fixture plate 66 to the plate 22.

It will be observed that a central aperture 70 is provided in the plate 22 for providing access to the centrally located cam driving bolt 40 within the housing 30 (see FIG. 4). This enables the bolt 40 to be manipulated by means of an appropriate tool extended through the aperture 70 after the housing 30 has been placed within the end of the pipe section 12 with the plate 22 attached to the forward end of the mandrel by means of the carrier shafts 48.

The lathe 14 includes a rotatable head 70 driven by a motor 72 through a chain and sprocket drive 74–76 (see FIG. 1). The lathe furthermore includes a housing 79 to which the motor and the rotatable head 70 are attached. Within the housing 79 and concentrically disposed within the rotatable head 70 is an extension of the mandrel engaging fixture 66 in the form of a shaft 78. It will be appreciated that the shaft 78 is secured in fixed relationship to the mandrel 10 by means of the removable fasteners 68 which secure the fixture 66 to the plate 22. The arrangement of the fixture 66 is such that the cutting plane 24 of the lathe 14 will be disposed so that the axis 26 is parallel to the plane 24 when the lathe 14 is secured to the plate 22 by means of the mandrel engaging fixture 66.

The housing 79 is prevented from rotating relative to the shaft 78 by means of one or more keys 80 slideable within keyways 82 on shaft 78. If a symmetrical set of keys and keyways are used around the perimeter of the shaft 78, its position relative to the housing 79 can be adjusted during assembly.

The lathe 14 is provided with a feed nut 84 that is rotatable by means of handles 86. The nut 84 threadedly engages a threaded extension 88 of the shaft 78, whereby, upon rotation of the nut 84, the housing 79 is advanced along the shaft 78 to move the cutter bit 16 into engagement with the workpiece 12. It is to be noted when the relationship between the cutting plane 24 and the miter axis 26 is such that the latter is included within the former, the cutter bits 16 are located at their final cutting position whereat the desired miter angle will have been cut on the end of the pipe section 12.

The cutter bits 16, in accordance with conventional practice, are adjustable radially on the lathe head 70 by means of suitable adjustment screws 90 and the bits are carried by tool carriers 92 that are fixed to the face of the tool head 70.

Accordingly, the motor 72 drives the tool head 70 about the principal longitudinal axis 94 of the lathe 14 and manipulation of the feed nut 84 causes the cutter bits 16 to advance so that the cutting plane includes the axis 26, at which point the miter has been produced on the end of the pipe section 12. All angular positions of the lathe 14 relative to the mandrel 10 are adjusted about the miter axis 26 to ensure that a precise miter cut will be produced on the end of the pipe 12. All other relative movement between the mandrel 10, pipe 12, and lathe 14 is constrained or controlled to ensure the precision of the miter cut.

It will be apparent that various modifications to the preferred embodiment can be made within the skill of the person skilled in the art; however, it is not intended that the scope of the invention is to be limited to the precise construction of the preferred embodiment, which is exemplary only. Rather, it is intended that the invention will be limited solely by the scope of the claims appended hereto.

What is claimed is:

1. A mandrel for a portable lathe including at least one orbiting tool bit and having a cutting plane defined as the plane including the orbital path of movement of the tool bit or bits driven by the lathe during a turning procedure, comprising:

a mandrel housing having a longitudinal axis;

radially extendable securing leg means and actuator means for extending and retracting the leg means radially of the longitudinal axis for securing the mandrel within a hollow workpiece;

lathe support means having means pivotally secured to the housing limiting pivotal movement of same only about a single miter axis, said miter axis extending transversely of and intersecting said longitudinal axis, said lathe support means including means to receive and be attached to a portable lathe with said miter axis extending parallel to the cutting plane of such a lathe; and means for releaseably locking said lathe support means in fixed angular position relative to said miter axis.

2. A mandrel as claimed in claim 1, said lathe support means secured to said housing by longitudinally projecting carrier shaft means attached to the housing by swivel joint means, said swivel joint means arranged to fix the location of the support means in a longitudinal direction relative to said housing and to fix the location of the miter axis relative to the housing.

3. A mandrel as claimed in claim 2, said swivel joint means comprising longitudinally opposed sets of spherical washer elements having their centers of curvature located on said miter axis.

4. A mandrel as claimed in claim 3, said swivel joint means also including trunnion means comprising cylindrical bearing means.

5. A mandrel as claimed in claim 4, said trunnion means located between said sets of spherical washer elements.

6. A mandrel as claimed in claim 5, said trunnion means comprising a cylindrical rotor mounted in close-fitting cylindrical aperture in the housing, the centerline of the aperture coinciding with said miter axis.

7. A mandrel as claimed in claim 6, said carrier shaft means extending generally longitudinally through said sets of spherical washer elements and said cylindrical rotor.

8. A mandrel as claimed in claim 7, including a laterally spaced pair of carrier shaft means, and corresponding pairs of swivel joint means associated with said carrier shaft means.

9. A mandrel as claimed in claim 1, said lathe support means attached to the forward end of said housing and comprising a transverse plate means including fastener receiving means.

10. A mandrel as claimed in claim 8, said plate means including an undercut shoulder area for centering a cooperating lathe element receivable in the undercut shoulder area.

11. A mandrel as claimed in claim 8, said lathe support means comprising a transverse plate means with apertures for receiving removable fasteners.

12. A mandrel as claimed in claim 11, said actuating means for extending and retracting the leg means comprising a longitudinally movable cam and a cooperating radially movable follower, and rotary threaded cam driving means connects to the cam, said cam driving means disposed centrally within the housing; said lathe support plate including a central aperture for providing access to said cam driving means.

13. A mandrel as claimed in claim 2, said carrier shaft means including at least one threaded end portion and a nut element threadedly engaging said end portion; said swivel joint means arranged so that it or they are lockable in fixed angular position by compressive forces; said nut element arranged so that it exerts a compressive force on said swivel joint means when advanced along said end portion; said means for releasably locking said lathe support means in fixed angular position relative to said housing comprising said nut elements.

14. A mandrel as claimed in claim 1, including a portable lathe having at least one tool bit arranged to be driven orbitally about the lathe turning axis in a cutting plane; means for driving the tool bit in its orbital path about the turning axis; and a fixed, centrally located mandrel engaging fixture disposed at the forward end of said lathe adjacent its cutting plane, said mandrel engaging fixture secured to said lathe support means so that the longitudinal axis of the mandrel and the lathe turning axis intersect each other in a common longitudinal plane, with the mandrel miter axis lying parallel to the cutting plane of the lathe.

15. A mandrel as claimed in claim 14, including feed means for advancing the lathe longitudinally along its turning axis with respect to said mandrel engaging fixture for axially adjusting the cutting plane position.

16. A mandrel as claimed in claim 14, including a lathe support shaft extending longitudinally through said lathe, said mandrel engaging fixture rigidly connected to said support shaft; and feed means for advancing the lathe along the support shaft while the latter is held in fixed position; said lathe including a cutter head that carries said tool bit and is rotatable about said support shaft adjacent said mandrel engaging fixture; and motor drive means attached to the lathe so that it drives the cutter head in rotation when actuated.

* * * * *